(12) United States Patent
Dent

(10) Patent No.: US 11,196,272 B2
(45) Date of Patent: Dec. 7, 2021

(54) RAPID DE-ENERGIZATION OF DC CONDUCTORS WITH A POWER SOURCE AT BOTH ENDS

(71) Applicant: Koolbridge Solar, Inc., Wrightsville Beach, NC (US)

(72) Inventor: Paul Wilkinson Dent, Pittsboro, NC (US)

(73) Assignee: Koolbridge Solar, Inc., Wrightsville Beach, NC (US)

( * ) Notice: Subject to any disclaimer, the term of this patent is extended or adjusted under 35 U.S.C. 154(b) by 0 days.

(21) Appl. No.: 15/197,431

(22) Filed: Jun. 29, 2016

(65) Prior Publication Data

US 2018/0006601 A1  Jan. 4, 2018

(51) Int. Cl.
| | |
|---|---|
| *H02J 7/00* | (2006.01) |
| *H02J 7/35* | (2006.01) |
| *H02H 9/04* | (2006.01) |
| *H02H 3/20* | (2006.01) |
| *H02S 40/00* | (2014.01) |

(52) U.S. Cl.
CPC ........... *H02J 7/0029* (2013.01); *H02H 3/202* (2013.01); *H02H 9/045* (2013.01); *H02J 7/35* (2013.01); *H02S 40/00* (2013.01); *Y02E 10/56* (2013.01)

(58) Field of Classification Search
CPC .......... H02J 3/383; H02J 3/385; H02J 7/0029; H02S 40/00
See application file for complete search history.

(56) References Cited

U.S. PATENT DOCUMENTS

| | | | |
|---|---|---|---|
| 3,340,457 A | 9/1967 | Schmitz | |
| 3,805,141 A | 4/1974 | Pompa, Jr. et al. | |
| 3,958,174 A | 5/1976 | Studtmann et al. | |
| 4,084,220 A | 4/1978 | Akamatsu | |
| 4,180,853 A | 12/1979 | Scorso, Jr. et al. | |
| 4,204,268 A | 5/1980 | Vivirito | |
| 4,306,183 A * | 12/1981 | Wright ................... | G05F 1/613 136/293 |
| 4,320,449 A | 3/1982 | Carroll | |
| 4,626,764 A * | 12/1986 | Weinhardt ............... | H02J 7/35 136/293 |
| 4,803,611 A | 2/1989 | Sashida et al. | |
| 4,882,120 A | 11/1989 | Roe et al. | |

(Continued)

FOREIGN PATENT DOCUMENTS

| | | |
|---|---|---|
| CN | 101350569 A | 1/2009 |
| CN | 202444440 U | 9/2012 |

(Continued)

OTHER PUBLICATIONS

Intersil, George E. Danz, HIP4080, 80V High Frequency H-Bridge Driver, Application Note. AN9324.4, Mar. 2003.

*Primary Examiner* — Adi Amrany
(74) *Attorney, Agent, or Firm* — Coats & Bennett, PLLC

(57) ABSTRACT

A method, circuit and system arrangement is described for providing rapid de-energization for safety reasons of conductors having a DC power source at both ends. The invention is particularly envisaged for use in solar energy systems in which a battery is charged by solar power from a photovoltaic array, the invention comprising controlling the array to interrupt charge current flow and then isolating the battery from the conductors to be de-energized in a fail-safe manner.

14 Claims, 8 Drawing Sheets

(56) References Cited

U.S. PATENT DOCUMENTS

| | | | |
|---|---|---|---|
| 5,153,497 A * | 10/1992 | Eiden | H02J 7/35 136/293 |
| 5,226,077 A | 7/1993 | Lynn et al. | |
| 5,270,636 A * | 12/1993 | Lafferty | G05F 1/67 136/293 |
| 5,373,433 A | 12/1994 | Thomas | |
| 5,424,894 A | 6/1995 | Briscall et al. | |
| 5,479,086 A | 12/1995 | Konstanzer | |
| 5,625,276 A | 4/1997 | Scott et al. | |
| 5,714,869 A * | 2/1998 | Tamechika | H02J 7/0031 320/101 |
| 5,726,505 A * | 3/1998 | Yamada | H02H 3/18 307/116 |
| 5,930,128 A | 7/1999 | Dent | |
| 5,991,645 A | 11/1999 | Yuen et al. | |
| 6,051,954 A * | 4/2000 | Nagao | F21S 9/032 320/101 |
| 6,154,379 A | 11/2000 | Okita | |
| 7,057,485 B2 | 6/2006 | Preusse et al. | |
| 7,082,040 B2 | 7/2006 | Raddi et al. | |
| 7,138,730 B2 | 11/2006 | Lai | |
| 7,474,016 B2 | 1/2009 | Wang et al. | |
| 8,185,762 B1 * | 5/2012 | Spangler | G06F 1/3265 713/323 |
| 8,859,884 B2 * | 10/2014 | Dunton | H03K 17/691 136/251 |
| 8,891,211 B2 | 11/2014 | Dent | |
| 8,937,822 B2 | 1/2015 | Dent | |
| 9,455,645 B1 | 9/2016 | Zhou et al. | |
| 9,812,869 B2 * | 11/2017 | Narla | H02J 3/381 |
| 9,843,193 B2 * | 12/2017 | Getsla | H02J 3/383 |
| 2002/0047455 A1 | 4/2002 | Dhyanchand et al. | |
| 2003/0094929 A1 | 5/2003 | Pendell | |
| 2003/0094931 A1 * | 5/2003 | Renyolds | H02J 7/35 323/285 |
| 2003/0179063 A1 | 9/2003 | Preusse et al. | |
| 2004/0100149 A1 | 5/2004 | Lai | |
| 2005/0001598 A1 | 1/2005 | Belokon et al. | |
| 2005/0056021 A1 | 3/2005 | Belokon et al. | |
| 2005/0073292 A1 | 4/2005 | Hastings et al. | |
| 2005/0180083 A1 | 8/2005 | Takahara et al. | |
| 2006/0158037 A1 | 7/2006 | Danley et al. | |
| 2007/0095062 A1 | 5/2007 | Chertok | |
| 2007/0292724 A1 | 12/2007 | Gilchrist | |
| 2009/0015071 A1 * | 1/2009 | Iwata | H02M 7/49 307/77 |
| 2009/0161392 A1 | 6/2009 | Zhang et al. | |
| 2009/0184706 A1 | 7/2009 | Duric et al. | |
| 2009/0206666 A1 | 8/2009 | Sella et al. | |
| 2009/0207543 A1 * | 8/2009 | Boniface | H02H 3/16 361/86 |
| 2010/0064424 A1 * | 3/2010 | Hsu | E03D 5/10 4/304 |
| 2010/0110742 A1 * | 5/2010 | West | H02H 3/16 363/132 |
| 2011/0037600 A1 | 2/2011 | Takehara et al. | |
| 2011/0037602 A1 * | 2/2011 | Chrosny | H01L 31/02021 340/635 |
| 2011/0043160 A1 | 2/2011 | Serban | |
| 2011/0090607 A1 | 4/2011 | Luebke et al. | |
| 2011/0140520 A1 | 6/2011 | Lee | |
| 2011/0141644 A1 * | 6/2011 | Hastings | H01L 31/02021 361/93.2 |
| 2011/0285354 A1 * | 11/2011 | Iwasa | H02J 7/0031 320/137 |
| 2011/0301772 A1 | 12/2011 | Zuercher et al. | |
| 2012/0007459 A1 | 1/2012 | Mondal et al. | |
| 2012/0048325 A1 | 3/2012 | Matsuo et al. | |
| 2012/0049637 A1 | 3/2012 | Teichmann et al. | |
| 2012/0112557 A1 | 5/2012 | Sager | |
| 2012/0242145 A1 | 9/2012 | Espeut, Jr. | |
| 2012/0281444 A1 | 11/2012 | Dent | |
| 2013/0057997 A1 | 3/2013 | Dent | |
| 2013/0058144 A1 | 3/2013 | Hiramatsu et al. | |
| 2013/0070494 A1 | 3/2013 | Rotzoll | |
| 2013/0181655 A1 * | 7/2013 | Yokoyama | H02J 7/35 320/101 |
| 2013/0181703 A1 | 7/2013 | Ausserlechner | |
| 2013/0245614 A1 | 9/2013 | Seebruch | |
| 2013/0320929 A1 | 12/2013 | Walker et al. | |
| 2014/0001864 A1 * | 1/2014 | Nirantare | H01L 31/02021 307/71 |
| 2014/0062206 A1 * | 3/2014 | Bryson | H02J 3/385 307/80 |
| 2014/0084687 A1 | 3/2014 | Dent | |
| 2014/0119072 A1 * | 5/2014 | Behrends | H02H 1/0015 363/55 |
| 2014/0153303 A1 | 6/2014 | Potharaju | |
| 2014/0266289 A1 | 9/2014 | Della Sera et al. | |
| 2014/0301003 A1 * | 10/2014 | Jankowski | H01L 31/02021 361/57 |
| 2015/0008748 A1 | 1/2015 | Deboy et al. | |
| 2015/0043110 A1 | 2/2015 | Dent | |
| 2015/0217656 A1 | 8/2015 | Loftus et al. | |
| 2015/0229131 A1 * | 8/2015 | Gerhardinger | H02J 3/385 307/22 |
| 2015/0270731 A1 * | 9/2015 | Adelmann | H02J 7/35 320/101 |
| 2015/0288225 A1 | 10/2015 | Dent | |
| 2015/0295413 A1 * | 10/2015 | Dent | H02M 7/53871 307/77 |
| 2015/0309075 A1 * | 10/2015 | Parks | G01R 1/0416 324/126 |
| 2015/0318796 A1 | 11/2015 | Dent | |
| 2015/0340868 A1 * | 11/2015 | Chapman | H02J 3/383 307/82 |
| 2015/0349708 A1 * | 12/2015 | Moslehi | H02S 40/30 136/251 |
| 2016/0006392 A1 * | 1/2016 | Hoft | H02H 3/20 361/78 |
| 2016/0036235 A1 * | 2/2016 | Getsla | H02J 3/383 307/80 |
| 2016/0065090 A1 | 3/2016 | Dent | |
| 2016/0141846 A1 * | 5/2016 | Atchley | H01H 71/02 361/605 |
| 2016/0181752 A1 * | 6/2016 | Parks | B60R 16/02 439/517 |
| 2016/0211797 A1 * | 7/2016 | Zhu | H02S 40/34 |
| 2016/0224083 A1 | 8/2016 | Dent et al. | |
| 2016/0226560 A1 | 8/2016 | Dent | |
| 2016/0261226 A1 * | 9/2016 | Hamilton | H02S 20/32 |
| 2016/0276837 A1 | 9/2016 | Manjrekar | |
| 2016/0322827 A1 * | 11/2016 | Gupta | H02M 3/04 |
| 2017/0070081 A1 * | 3/2017 | Cher | H02S 40/38 |
| 2017/0155274 A1 * | 6/2017 | Cher | H02S 40/38 |
| 2017/0346413 A1 | 11/2017 | Dent | |
| 2018/0026550 A1 | 1/2018 | Dent | |
| 2018/0062015 A1 * | 3/2018 | Ni | G05F 1/67 |

FOREIGN PATENT DOCUMENTS

| | | |
|---|---|---|
| EP | 2544354 A2 | 1/2013 |
| EP | 2698894 A2 | 2/2014 |
| GB | 1433402 A | 4/1976 |
| WO | 2012140495 A2 | 10/2012 |
| WO | 2016033394 A1 | 3/2016 |
| WO | 2016204830 A1 | 12/2016 |

* cited by examiner

RAPID DE-ENERGIZATION OF DC CONDUCTORS WITH A POWER SOURCE AT BOTH ENDS

BACKGROUND

The present invention relates to photovoltaic energy systems.

A photovoltaic energy installation comprises solar panels for generating electricity which may typically be installed high up on the roof of a building out of the way of shadowing. In some systems, the DC generated by the solar panels may be used to charge a battery so that the energy can be used at different time than when it was collected. Batteries are heavy and would generally be installed in a suitably ventilated utility room on a lower floor of a building. Wires carry the DC from the solar panels to the battery and various forms of charge controller may be used to control the amount of solar energy pumped into the battery.

The US National Electrical Code (the NEC) dated 2014 includes a requirement to be able to de-energize DC wiring more than 10 feet from the solar panels in the event of an emergency such as fire. The means to effect such de-energization shall be simple and accessible. The code was written to apply to the then most common solar energy installations, which are of the "grid tied" type, and did not involve a battery. U.S. patent application Ser. No. 13/103,170 to current Applicant, filed May 8, 2011, now issued U.S. Pat. No. 8,937,822 describes a remote-controlled solar combiner having the ability to disconnect the solar panels at source. U.S. patent application Ser. Nos. 14/512,417 and 14/749,339 to current Applicant claim priority from the above '822 patent and claim remote-controlled photovoltaic combiners having a remote controlled disconnect capability to de-energize wiring in accordance with the 2014 NEC from excitation by the solar panel-derived electricity. The above '070, '417 and '339 Applications are hereby incorporated by reference herein in their entirety.

When solar electricity is used to charge a battery under the control of a charge controller, the charge controllers may not intrinsically have the property of preventing potential back feed to isolate the battery from the wiring between the battery or charge controller and the solar panels. The issue to be solved in that case therefore is the de-energization of wiring having a power source at both ends.

SUMMARY

A solar array comprising strings of solar panels is connected to a solar combiner which performs the function of combining the strings in parallel, preferably using blocking diodes to prevent a shadowed panel or string robbing current from more strongly illuminated panels or strings and also performs the function of disconnecting under remote control the solar strings from the photovoltaic output conductors that carry the combined solar output current to charge a battery.

At the location of the battery, a combination of an overcurrent protection device (OCPD) and a unidirectional conducting device is placed in series with at least one of the photovoltaic output circuit conductors, thereby serving the dual purpose of preventing back-energization of the conductors from the battery and protecting the conductors from the double fault condition of a short circuit between the photovoltaic output conductors and a short-circuit failure of the unidirectional conducting device. In addition, a normally closed crowbar switch is used to apply a deliberate short circuit between the photovoltaic output conductors whenever the solar combiner is remote controlled to disconnect all solar panel strings from the photovoltaic output circuit.

In one implementation, the unidirectional conducting device is a diode, while in an other implementation the unidirectional conducting device is a MOSFET having an intrinsic drain-source diode, the MOSFET being controlled simultaneously with the crowbar switch such that the MOSFET is OFF when the crowbar switch is short circuit. The crowbar switch may be located alternatively in the solar combiner or at the battery location.

DETAILED DESCRIPTION

Figure 1:
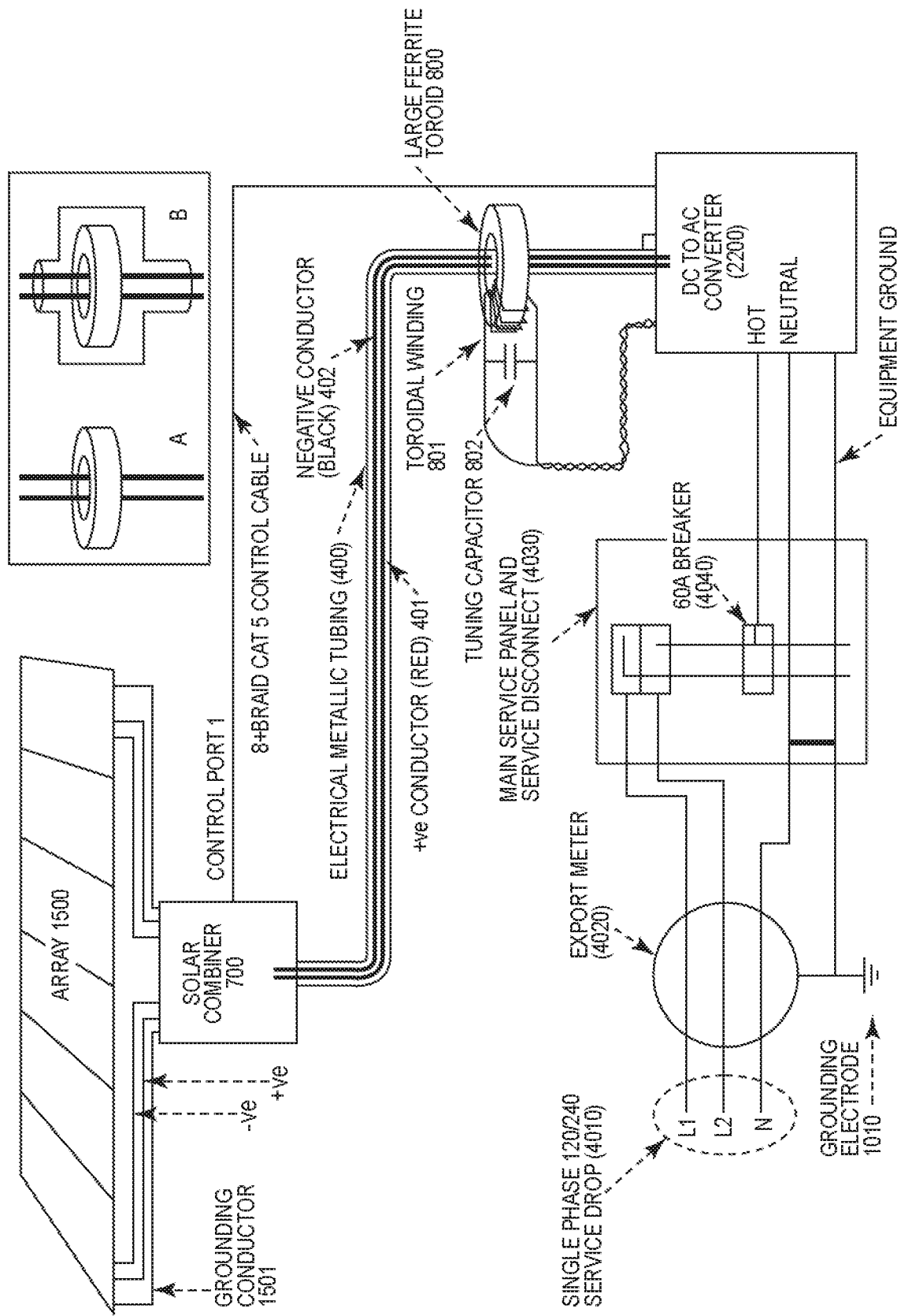
FIG. 1 shows a grid-tied solar system

FIG. 1 shows a grid-tied solar energy system as described in the above-incorporated '822 patent. Solar combiner (700) combines selected strings of solar panels from array (1500) to produce a combined photovoltaic output current in photovoltaic output conductors (401,402) which, according to current National Electrical Code requirements, shall be contained in metallic conduit (400).

The combined solar current is applied to DC to AC converter (2200) to generate a pure sinewave current at the grid frequency (e.g. 60 Hz) which is fed back to the grid through breaker (4040) to offset power consumption consumed from the grid. Assuming that DC-to-AC converter is configured to disallow grid power from being synchronously rectified and fed back up the photovoltaic output conductors towards combiner (700), there is only one source of power, that is the solar array. For the purpose of de-energizing the photovoltaic output conductors (401,402) when emergency service personnel are attending an incident at the property, this is guaranteed by switching off converter (2200), which in turn will operate the remote DC disconnect facility of combiner (700) by means of the control cable running between converter (2200) and control port 1 of combiner (700). The above operation is described and claimed in the above-incorporated Applications.

Figure 2:
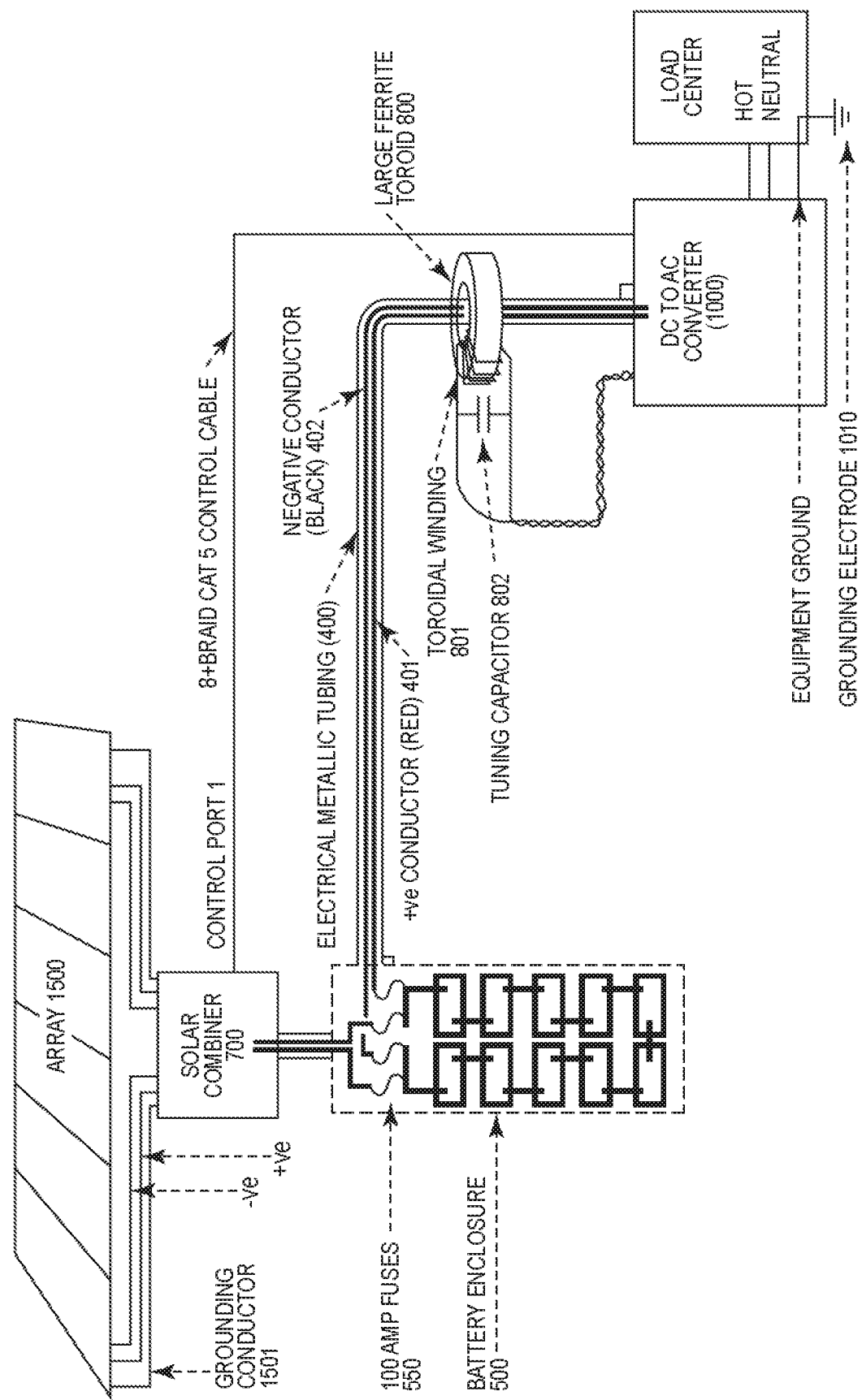
FIG. 2 shows a solar system having a solar-charged battery

FIG. 2 shows an alternative solar installation in which solar energy is used to charge a battery (500). Energy stored in the battery may be extracted later or at the same time as charging to be converted to AC power by DC to AC converter (1000). DC to AC converter (1000) has the capability to power loads directly and so can power a home not connected to the grid, or when the grid is in outage.

Converter (1000) also preferably acts as a battery charge controller by monitoring battery state and controlling solar combiner (700) via the control cable to connect more or fewer solar strings through to charge the battery.

Figure 3:
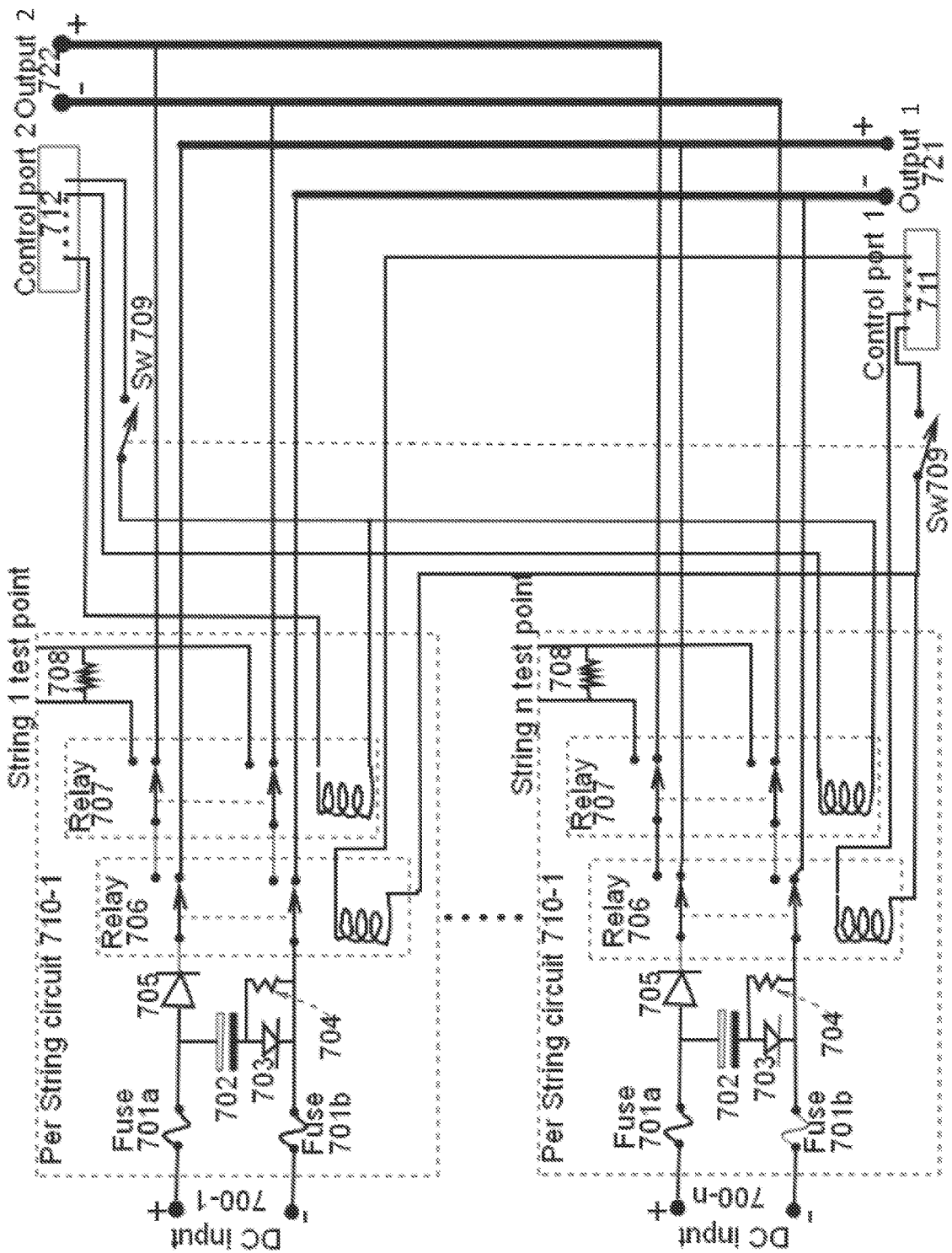
FIG. 3 shows a remote-controlled solar combiner and DC disconnect

FIG. 3 illustrates the principle of combiner (700). The connector (711) for Control port 1 carries current to the coils of relays (706), of which there is one per string to be combined. The return path for the current is through switch (709). Switch (709) may be located on the combiner and accessible for manual operation, or may be a microswitch which opens when the front panel of the combiner is opened. When switch (709) is opened, all relays (706) and (707) are de-energized so that no string is connected through either to photovoltaic output 1 (722) or output 2 (721). The same effect may be had by interrupting the relay coil return path at the converter, or by controlling all relays to be de-energized. If the converter supplies power to the relay coils only when operating, then switching off the converter will automatically de-energize the relays and thus de-energize the associated photovoltaic output circuit (721 or 722). Thus the means to prevent the photovoltaic output circuit being energized by the solar panels is provided by the remote-controlled solar combiner (700). In FIG. 2 however, the battery can still energize the photovoltaic output circuit conductors leading from the battery (500) to the combiner (700). To disable this source of energization also, additional components may be associated with the battery according to this invention, as shown in FIG. 4.

Figure 4:
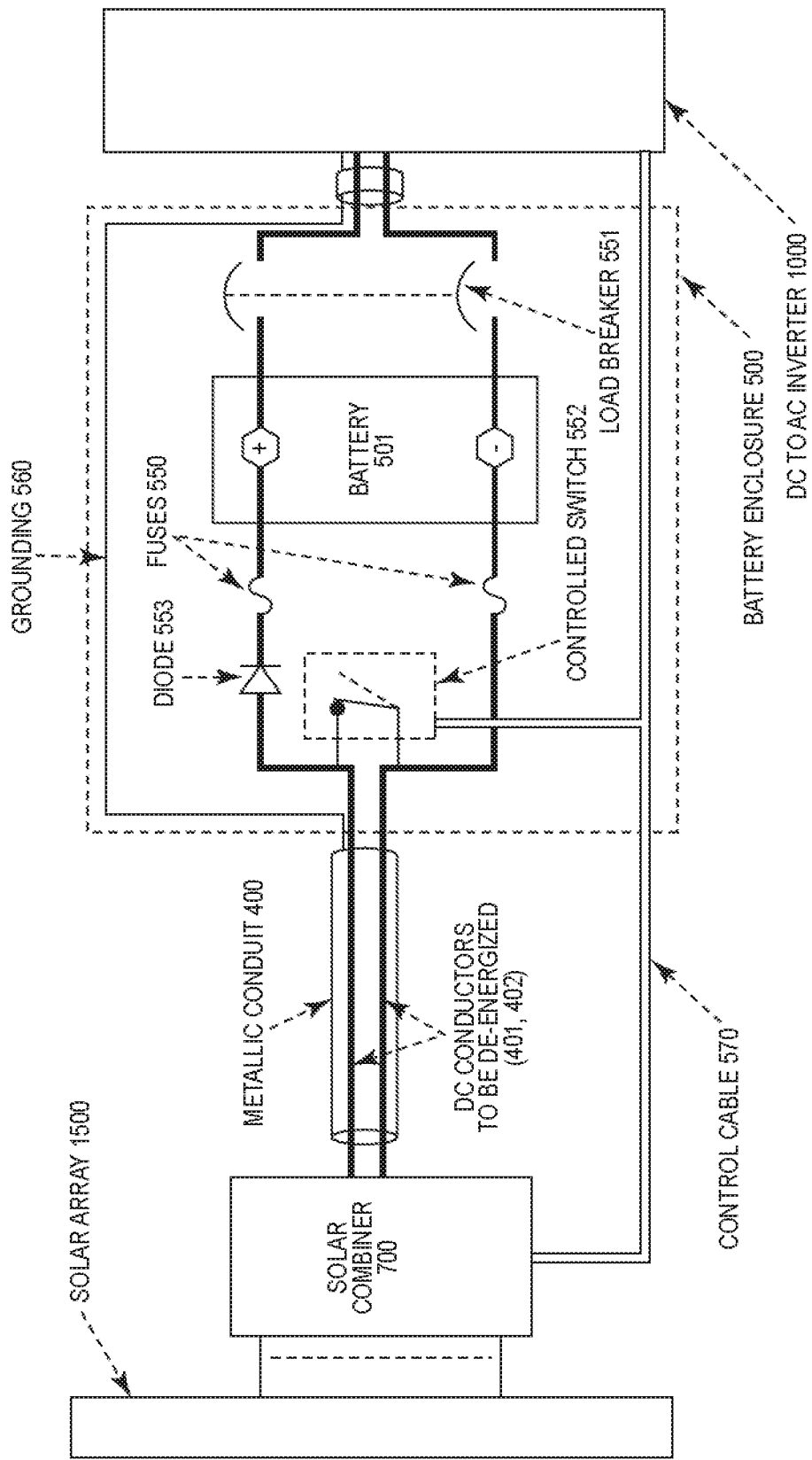
FIG. 4 shows one implementation of the invention

FIG. 4 shows a battery (501) contained in a battery enclosure (500). The battery enclosure (500) shall be vented to the outside air to prevent build up of hydrogen and battery odors. In FIG. 4, the connection from the battery to the load (DC to AC converter 1000) is through circuit breaker (551) as opposed to the alternative of fuses (550) shown in FIG. 2. Either overcurrent protection method is acceptable, but the use of a circuit breaker provides a more convenient manual means to disconnect the battery from the inverter than unplugging fuses. When the DC supply to converter (1000) is bipolar or floating, breaker (551) may be two-pole breaker (as illustrated), or may be a single pole breaker if one side of the DC is grounded. Fuses (550) are still used in FIG. 4 as in FIG. 2 to protect the DC conductors (401,402) from overcurrent.

The first additional component that is evident in FIG. 4 compared to FIG. 2 is diode (553). This prevents reverse current flow from the battery towards combiner (700) should anything unintentionally contact conductors (401,402). Thus in principle, operating the remote disconnect facility of combiner (700) by means of appropriate signals on control cable (570) now de-energizes conductors (401,402) from both power sources, the solar array and the battery. Moreover, diode (553) if properly functioning ensures that fuses (55) should never blow, as reverse current cannot flow. However, semiconductor devices are known to fail in the short circuit condition and thus cannot be totally relied upon for overcurrent protection; hence fuses (550) are still included.

It is also desired to ensure that conductors (401,402) are able to be de-energized to a safe level even if diode (553) has failed short circuit or become leaky. Thus the second new component in FIG. 4 as compared to FIG. 2 is controlled crowbar switch (552). Switch (552) can for example comprise a pair of normally closed relay contacts that apply a short circuit between conductors (401,402) unless the relay is energized to open the contacts. The same control signal that energizes the relays in combiner (700) to apply power to conductors (401,402) can be used to energize switch (552) to open its contacts. In the absence of that control signal, combiner 700 will not supply array power to conductors (401,402) and control switch (552) will remain closed. If diode (553) has failed short circuit, one or both of fuses (550) will blow when switch (552) is closed. Since this only happens when diode (553) is faulty, and that is expected to be a rare event, it is not expected that a high incidence of fuses (550) blowing will be encountered in service. Moreover, since diode (553) failing and fuses (550) blowing will always occur together, they can be packaged together as a replaceable sub-assembly.

In FIG. 4, controlled crowbar switch (552) is shown located at the battery. However, it could alternatively be located in solar combiner (700), or in both places.

Figure 5:
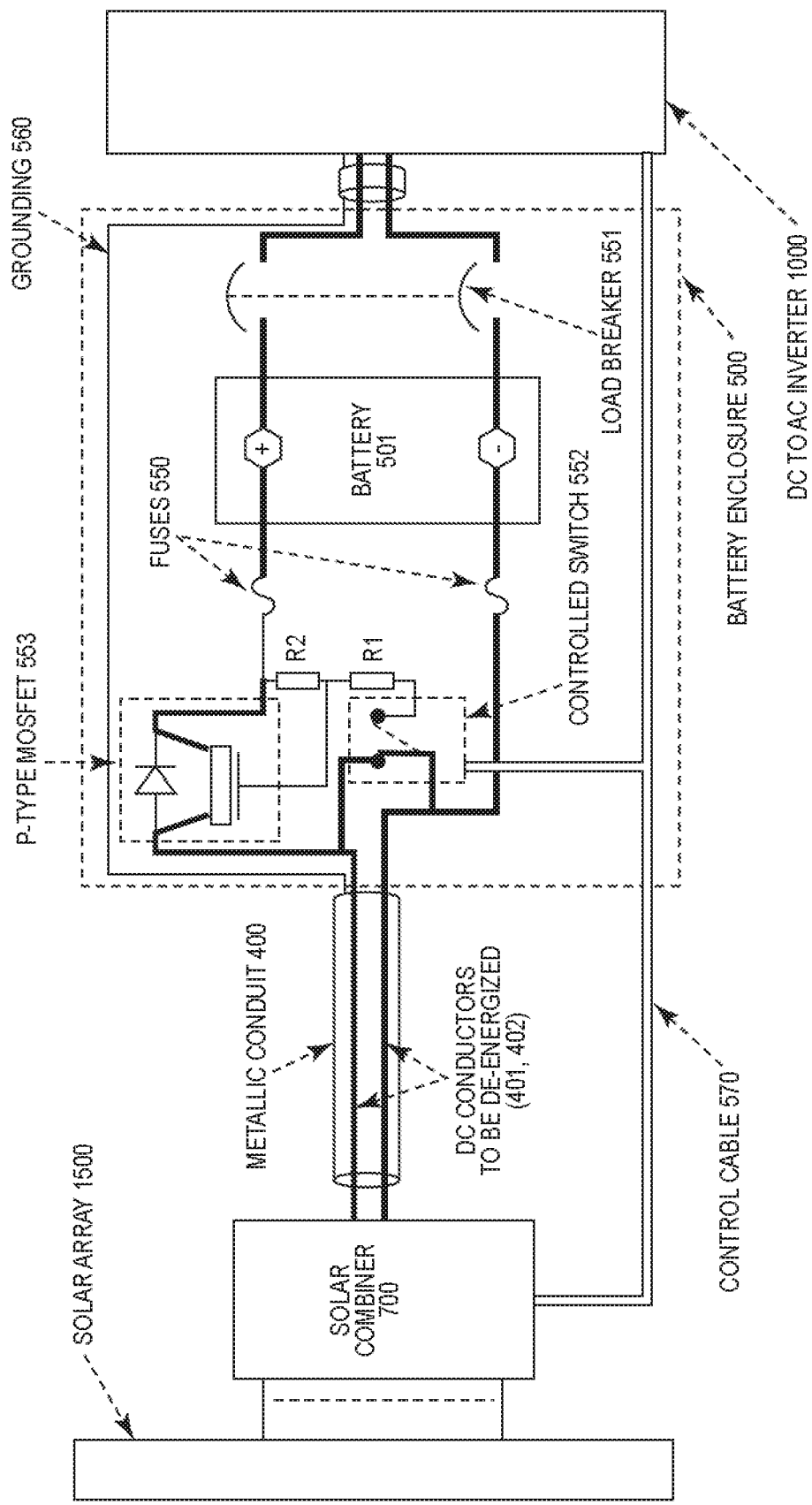
FIG. 5 shows a second implementation of the invention using a P-type MOSFET series switch

Diode (553) passes all the of the solar array power, perhaps 40 amps at 125 volts in the case of a 5 KW system. The voltage drop of the diode lies in the 0.6 to 1 volt range, which represents a fractional power loss of 0.5% to 0.8%, but more significantly, involves heat dissipation of between 24 and 40 watts. To reduce the power loss and heat dissipation, an alternative to using diode (553) alone is to use a MOSFET transistor having an intrinsic drain-source diode, the transistor being turned on to short out the diode drop under normal circumstances. Such a circuit is shown in FIG. 5 as second implementation. P-type MOSFET 553 intrinsically comprises the diode 553 of FIG. 4. However, switch 552 is now a SPDT relay that applies the negative of the battery through potential divided R1,R2 to the gate of MOSFET 553 when switch 552 is activated to remove the short from between conductors (401,402). This turns MOSFET 553 on, thereby passing current from the solar array to the battery with a voltage drop less than that of the diode alone. For example, 10 P-type MOSFET chips type FDMS86263P in parallel will provide an ON resistance of about 5 milliohms, giving 200 mV drop at 40 amps, and 8 watts of heat to be dissipated.

Figure 6:
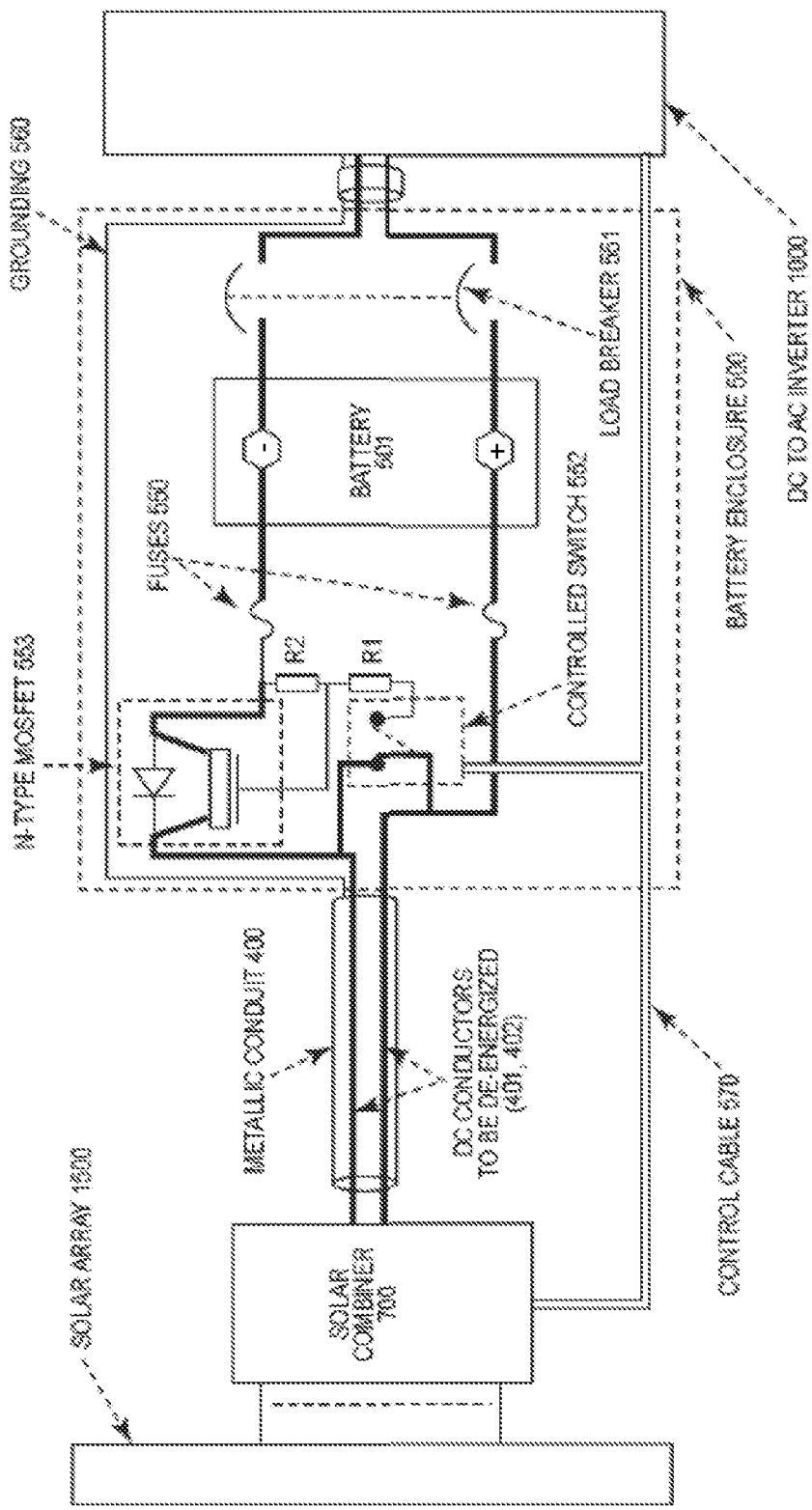
FIG. 6 shows a second implementation using an N-type MOSFET series switch

Since P-type MOSFETs do not have characteristics as good as N-type MOSFETs, FIG. 6 shows a version of the invention using an N-type MOSFET as the series switch. To derive FIG. 6 from FIG. 5, it was merely necessary to interchange the polarity of the battery terminals and associated connections to the array and the inverter, and to select an N-type MOSFET for series switch 553, the intrinsic diode of which is now facing the other way. Three N-type MOSFETs type FDP075N15A in parallel now provide an ON resistance of about 2.5 milliohms and thus about 100 mv voltage drop at 40 amps, reducing the heat loss to 4 watts.

Of course if it is considered necessary to isolate both poles of the battery, a P-type series MOSFET switch can be placed in the positive lead as per FIG. 5, while an N-type series MOSFET switch is used in the negative lead, as per FIG. 6.

The lowest voltage drop of all would likely be achieved by using a high current relay as a series switch in place of diode or diode/MOSFET combination 553. This is shown in FIG. 7.

Figure 7:
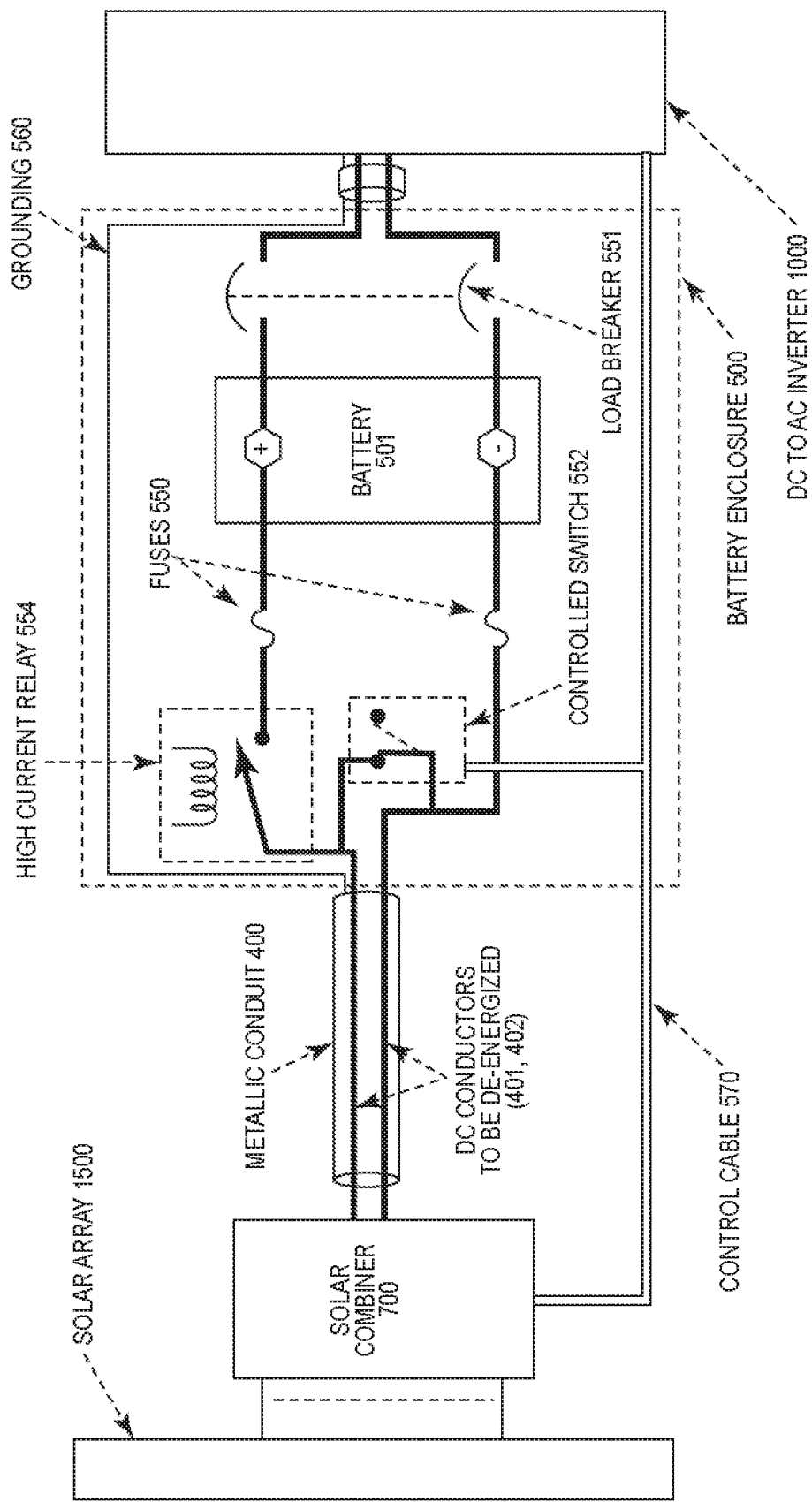
FIG. 7 shows an implementation using a series relay switch

In FIG. 7, the high-current relay (554) can be of a lower cost type providing it is not required to open with current flowing through it. This may be ensured by timing the solar disconnect within solar combiner (700) to occur before relay (554) is commanded to open. Another timing requirement is that switch (552) should not close before relay (554) is open, and it must open before relay (554) closes. A control circuit is therefore required to ensure these relative timings. An advantage of the simple diode circuit of FIG. 5 is that no such timing constraints are required. In FIG. 6, the timing constraints are likewise simple, as MOSFET series switch (553) is synchronized to switch (552) by the Normally Open contact of switch (552). However, for FIG. 7, more discussion of how to arrange for proper timing is required, which is explained with the aid of FIG. 8.

In one embodiment (not pictured), crowbar switch 552 is a high current MOSFET (Q1). The requirements on Q1 do not include very low loss resistance, unlike if it was used as a series switch. The requirement is merely that it should pass enough current to blow one of fuses (550) should it inadvertently be placed into conduction with switch 554 closed. The latter condition however is to be avoided by ensuring proper timing of the opening of switch (554) before switch (552) closes. Moreover, switch (554) should not open before switches 706 or 707 (as also depicted in FIG. 3) have opened.

Figure 8:
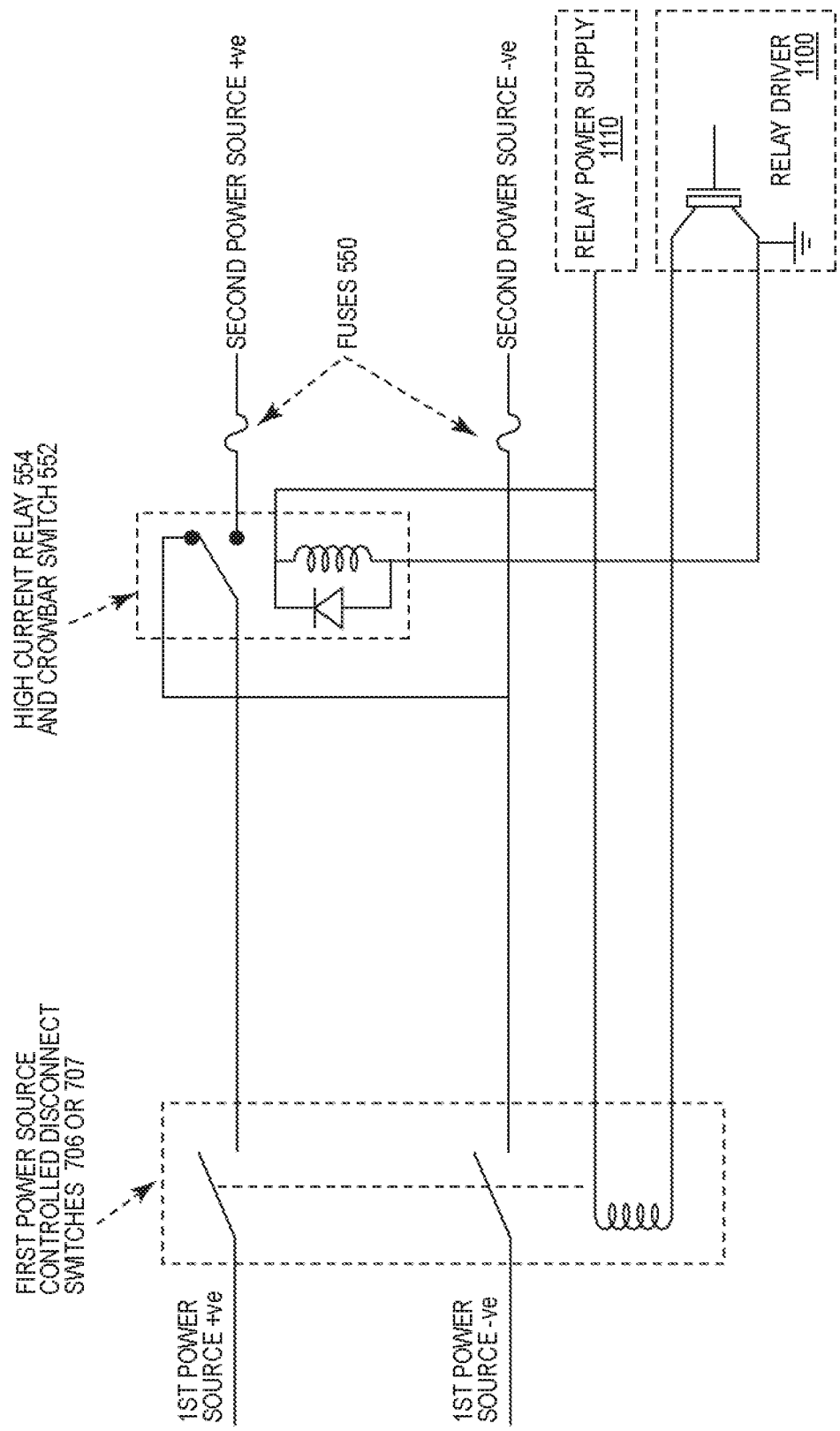
FIG. 8 shows an arrangement for switch sequence timing

FIG. 8 shows that switches 706 or 707 (also of FIG. 3) are controlled by a relay driver (1100) which is envisaged to be part of inverter (1000), as described in the above-incorporated '822 patent. There is a relay driver output for each relay (706 or 707) of remote controlled solar combiner (700), which are controlled as a means to control battery charging. FIG. 8 is more general however than the envisaged solar application. FIG. 8 presumes that there is a first power source on the left feeding current to a second power source on the right, and controlled switches (706 or 707) may be controlled by disabling the relevant relay driver (1100) to interrupt the current flow from the first power source to the second power source. It is also presumed that any steps necessary to shield switches (706 or 707) from sparking upon sudden current interruption have been taken at power source 1 end.

It may be seen that switches (706 or 707) are opened by relay driver (1100) removing the ground return for power supply (1100) to switches (706 or 707) while leaving the power supply and ground connections to high current relay (554) intact. Thus switches (706 or 707) may be controlled to open while leaving high-current relay (554) contacts closed, and then controlling power supply (1100) to be OFF removes the drive to the coil of high current relay (554) so that its contacts open afterwards. It may be appreciated that high current relay (554) has little electrical stress, as it only ever opens and closes with zero current through its contacts. The only requirement is that it must be able to carry the maximum current from the first source to the second source when the contacts are closed, and it must have sufficient insulation resistance to isolate the conductors (401,402) from the voltage of the second source when the contacts are open. These requirements are typically met by low-cost relays designed for automotive use.

In FIG. 8, choosing high current relay (554) to be a SPDT relay allows the 235 normally closed contact to function as crowbar switch (552). Since the relay cannot mechanically close the normally closed contact unless the normally open contact is opened, the probability of both contacts being closed and blowing fuses (550) is remote.

In the above-incorporated '882 patent, an inverter is described that uses a floating DC input of 120 volts nominal, and grounds the negative and the positive of the floating source alternately at 60 Hz. When the positive is grounded, the negative conductor of source 1 and 2 will be at −120 volts nominal. In that situation, it is not sufficient to open the positive connection between source 1 and source 2 using switch (554) to ensure de-energization of the conductors; however, when the inverter as described in the '882 patent is switched off, not only are neither the positive nor the negative of the source not grounded, but also the neutral output of the inverter is opened, as well as the live output, thus floating the inverter circuitry. Thus part of the de-energization of conductors (401,402) in such an installation comprises switching off the inverter, which also switches off the power supply (1100) which is incorporated within it. With other loads of unspecified behavior however, a second high current relay similar to relay (554) can be placed in the negative lead so that both positive and negative conductors leading from the first power to the second power source are broken at both ends. It is also possible to contemplate a transistor such as a MOSFET to function as crowbar switch (522) if it proves difficult to obtain SPDT relays for switch (554). It is also possible to envisage a double pole relay (554) to open both the negative and positive conductors, and being also specially designed to apply a short circuit between the moving contacts when in the de-energized condition. The latter may be done internally so that no external connections are required to the normally closed contacts. If a MOSFET transistor is used as crowbar switch (552), the switch must be ON when everything else is OFF. Therefore the voltage necessary to turn the gate on must come from an internal source, such as a charged capacitor. It is only necessary for the charge to be sufficient to keep the transistor operating as a crowbar switch long enough to blow fuses 550 if one of the series switches (554) has failed to open or diode (553) of FIG. 4 has failed short circuit.

It may also be mentioned that fuses (55) may be replaced by a suitable circuit breaker or any other suitable overcurrent protection device. Resettable circuit breakers are most appropriate if frequent tripping is expected, but if the not the case, then fuses may be the lower cost choice.

All of the above variations are deemed to fall within the scope and spirit of the invention as described by the attached claims

I claim:

1. A safety circuit and system arrangement for rapidly de-energizing at least a segment of DC conductors presenting a shock hazard to personnel and connected between a first power source on a first side of the segment of DC conductors presenting the shock hazard to personnel and a second power source on the second side of the segment of DC conductors presenting the shock hazard to personnel, the DC conductors carrying DC current from the first to the second power source, comprising:

at least one first controlled switch located on said first side of the segment of DC conductors presenting the shock hazard to personnel and operative to interrupt the DC current flow from said first power source to said second power source along said DC conductors;

at least one overcurrent protection device in series on at least one DC conductor;

voltage-blocking means located on said second side of said segment of DC conductors presenting the shock hazard to personnel, in series with said first controlled switch, and operative to prevent a voltage of said second power source from appearing on said DC conductors, thereby removing the shock hazard to personnel when said first controlled switch interrupts DC current flow from said first power source and said voltage-blocking means is operative;

a second controlled switch connected between said DC conductors on the second side of said segment of DC conductors presenting the shock hazard to personnel and controlled simultaneously with said first controlled switch to cause a short circuit between said DC conductors when said first controlled switch has interrupted said DC current flow; and wherein in response to said first controlled switch interrupting said DC current flow and said voltage-blocking means failing in a conductive state, said second controlled switch causes an overcurrent in the series connection of said failed voltage-blocking means and said overcurrent protection device sufficient to cause the overcurrent protection device to activate to isolate said DC conductors from said second power supply, thereby removing the shock hazard to personnel when said first controlled switch interrupts DC current flow from said first power source and said voltage-blocking means fails in a conductive state.

2. The safety circuit and system arrangement of claim 1 in which:
said voltage-blocking means operative to prevent the voltage of said second power source from appearing on said DC conductors comprises a diode orientated to inhibit reverse current flow from said second power source to said first power source;
said overcurrent protection device comprises a fuse to guard against short circuit failure of said diode; and
said second controlled switch comprises a controlled crowbar switch operative to apply a short circuit between said conductors to blow said fuse if said diode experiences a short circuit failure.

3. The safety circuit and system arrangement of claim 1 in which:
said voltage-blocking means operative to prevent the voltage of said second power source from appearing on said DC conductors comprises at least one MOSFET transistor switch having a low ON resistance connected in series with at least one of said conductors, said at least one MOSFET being a P-type MOSFET if connected in series with the positive conductor or an N-type MOSFET if connected in series with the negative conductor;
said overcurrent protection device comprises a fuse to guard against the MOSFETs failing short circuit; and
said second controlled switch comprises a crowbar switch operative to short the conductors together after all of said MOSFETs are turned OFF in order to blow said fuse if all of said MOSFETs experience a short circuit failure.

4. The safety circuit and system arrangement of claim 1 in which:
said voltage-blocking means operative to prevent the voltage of said second power source from appearing on said DC conductors comprises a high current relay connected in series with at least one of the positive or negative ones of said conductors;
said overcurrent protection device comprises a fuse to guard against said high current relay failing to open; and
said second controlled switch comprises a crowbar switch controlled to apply a short circuit between said conductors after said high current relay has been controlled to the open state in order to blow said fuse if said high current relay has failed to open.

5. The safety circuit and system arrangement of claim 1 in which:
said voltage-blocking means operative to prevent the voltage of said second power source from appearing on said DC conductors comprises a high current double throw relay with its energized connection contacts connected in series with at least one of the positive or negative ones of said conductors;
said overcurrent protection device comprises a fuse to guard against said high current relay failing to open; and
said second controlled switch comprises the non-energized connection contacts of said high current double throw relay being connected so as to apply a short circuit between said conductors after said energized connection contacts should have opened, in order to blow said fuse if in the event said energized connection contacts failed to open.

6. The safety circuit and system arrangement of claim 1 in which said first power source is a remote controlled solar combiner operative to combine the current from strings of solar panels of a photovoltaic array.

7. The safety circuit and system arrangement of claim 1 in which said second power source is a storage battery.

8. The safety circuit and system arrangement of claim 1 in which said second power source is a rechargeable storage battery, said first power source is a remote controlled solar combiner for combining the current from selectable strings of solar panels of a photovoltaic array, said strings to be combined being selected under the control of a battery charge controller and said battery charge controller selecting no strings to be combined in order to interrupt current flow to said battery when it is desired to de-energize said DC conductors.

9. A solar energy installation having a storage battery charged by a solar array having a system and circuit arrangement to provide rapid de-energization for safety reasons of at least a segment of DC conductors presenting a shock hazard to personnel between a string combiner and the battery, the DC conductors carrying charging current to the battery, comprising:
one or more first switches in the string combiner, on a first side of the segment of DC conductors presenting a shock hazard to personnel, which are controlled to interrupt said charging current when it is desired to de-energize said DC conductors;
voltage-blocking means in proximity to said battery on a second side of said segment of DC conductors presenting a shock hazard to personnel, and connected in series with said first switches, operative to prevent the voltage of said battery from appearing on said DC conductors when said charging current has been interrupted;
at least one overcurrent protection device in proximity to said voltage-blocking means on the second side of said segment of DC conductors presenting a shock hazard to personnel and operative to prevent current flow from the storage battery in the event of a short-circuit failure of the voltage-blocking means;
a second controlled switch connected between said conductors in proximity to said voltage-blocking means on the second side of said segment of DC conductors presenting a shock hazard to personnel and controlled to cause a short circuit between said conductors when said first switches have interrupted said charging current; and
wherein in response to said first controlled switch interrupting said DC power current flow and said voltage-blocking means failing in a conductive state, said second controlled switch causes an overcurrent in the series connection of said failed voltage-blocking means and said overcurrent protection device sufficient to cause the overcurrent protection device to activate to isolate said DC conductors from said battery.

10. A method of de-energizing conductors carrying DC current from a first power source to a second power source, wherein means to interrupt current flow is proximate to and associated with the first power source and means to isolate the second power source from the conductors is proximate to and associated with the second power source the method comprising:

interrupting the current flow from said first power source to said second power source by activating said means to interrupt current flow;

electrically isolating said second power source from said conductors by activating said means to isolate the second power source from the conductors; and in response to said electrically isolating step failing to isolate said second power source from said conductors, creating an overcurrent sufficient to actuate an overcurrent protection device.

11. The method of claim 10 in which said overcurrent protection device is a fuse.

12. The method of claim 10 wherein said means to interrupt current flow is a switch in series with at least one of the positive and negative conductor connections to said second power source.

13. The method of claim 10 in which said electrically isolating step is performed after performing said interrupting step.

14. The method of claim 10 in which said step of creating an overcurrent is performed after performing said isolating step.

* * * * *